Figure 1:
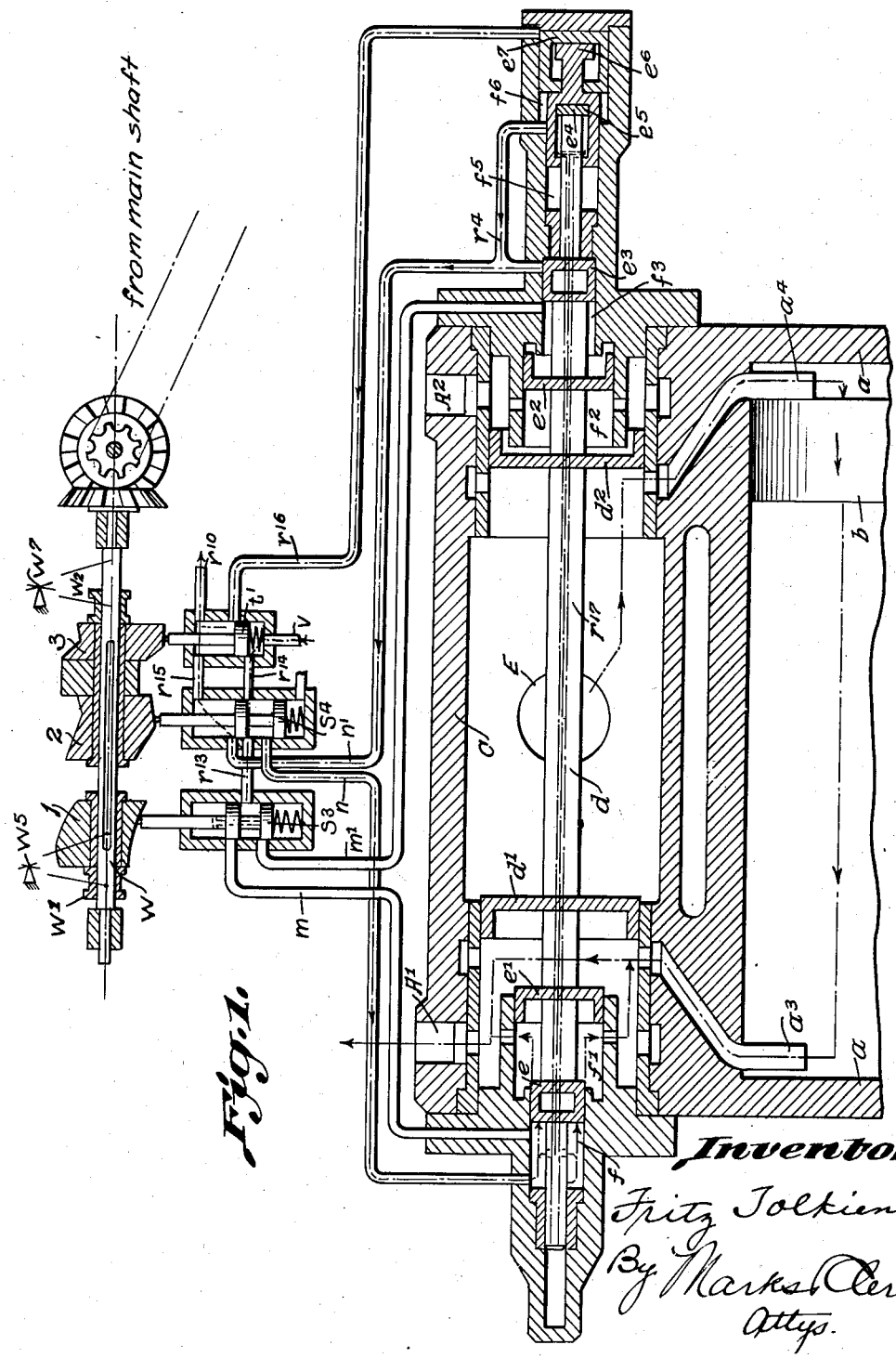

Jan. 1, 1935.  F. TOLKIEN  1,986,083
STEM ENGINE VALVE GEAR
Filed Feb. 7, 1930   6 Sheets-Sheet 6

F. Tolkien
INVENTOR
By: Marks & Clerk
Attys.

Patented Jan. 1, 1935

1,986,083

UNITED STATES PATENT OFFICE 1,986,083

STEAM ENGINE VALVE GEAR

Fritz Tolkien, Hanover, Germany

Application February 7, 1930, Serial No. 426,656
In Sweden May 6, 1929

3 Claims. (Cl. 121—157)

My application of the 27th May 1929, Ser. No. 366,394 relates to steam engines with fluid operated valves, in which at each end of the valve a differential piston, that is to say a small and a large piston was provided, which operate in corresponding spaces in the valve casing, thereby imparting motion to the actual main slide valve. In these known steam engines the steam was supplied to the differential pistons or their reversing spaces by the motion of the main slide valve being divided into two stages. The main slide valve first moves into the position in which it cuts off the steam supply to the power cylinder, so that the expansion will commence in the power cylinder. This determines the admission to the power cylinder (cut-off position). In this position, however, the outlet still remains open on the side of the power piston not under fluid pressure, so that the used steam will continue to be expelled.

On the main slide valve, owing to steam being admitted to the differential pistons, passing in the second stage of its motion out of this cut-off position, it will first cut off the steam outlet on the side of the power piston not under fluid pressure, so that on this side the compression will commence, and will finally, after reaching its extreme position, reverse the steam supply to the power cylinder.

The invention in my earlier application, Ser. No. 366,394 consists substantially in regulating the supply of the steam acting on the differential piston of the main slide valve both in the first stage of its motion for regulating the admission to the power cylinder and in the second stage of its motion for regulating the compression in the power cylinder by controlled poppet valves, or the like.

As already stated in these known steam engines the compression on the side of the piston which is not under fluid pressure only commences when the main slide valve has cut off the steam outlet after the commencement of the second stage of motion. The compression is thus limited as regards time to the period from the moment of this cut-off to the moment when the main slide valve arrives at the end of its motion.

The object of my present invention is to solve the problem of making the compression regulation finer so that any degree of compression can actually be obtained without difficulty. This is effected according to the invention by the second stage of motion of the main slide valve in which it travels from its cut-off position into its extreme position, being subdivided, the arrangement being such that the main slide valve is first brought into a position in which it cuts off both the steam admission on the side of the piston which is under fluid pressure and the steam exhaust on the side of the piston which is not under fluid pressure, whereupon after dwelling for a shorter or longer period in this position it completes its motion up to its extreme position. It is obvious that by this regulation of the slide valve motion in its second stage it is possible to obtain any desired degree of compression.

Figure 2:
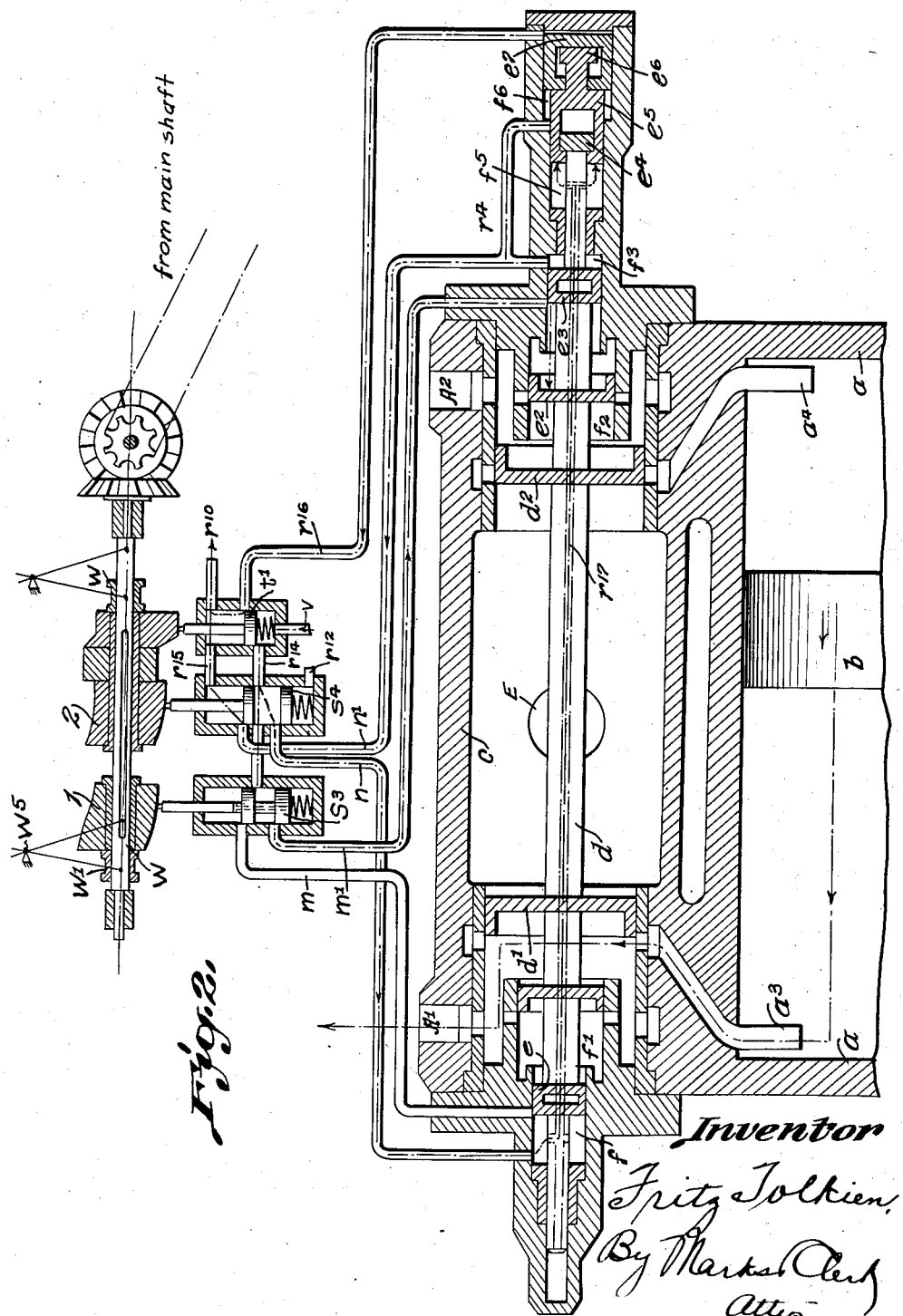
Figure 3:
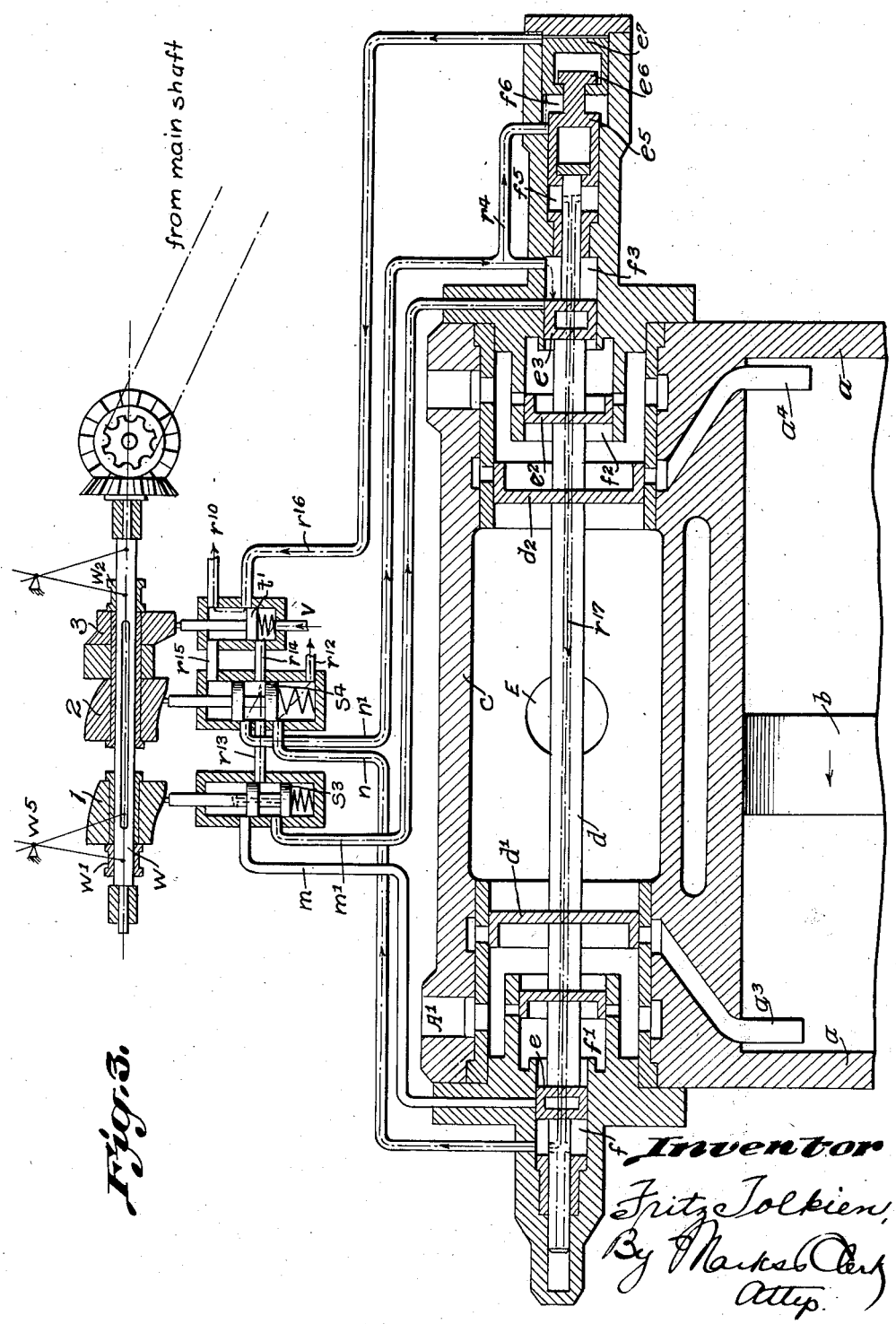
Figure 4:
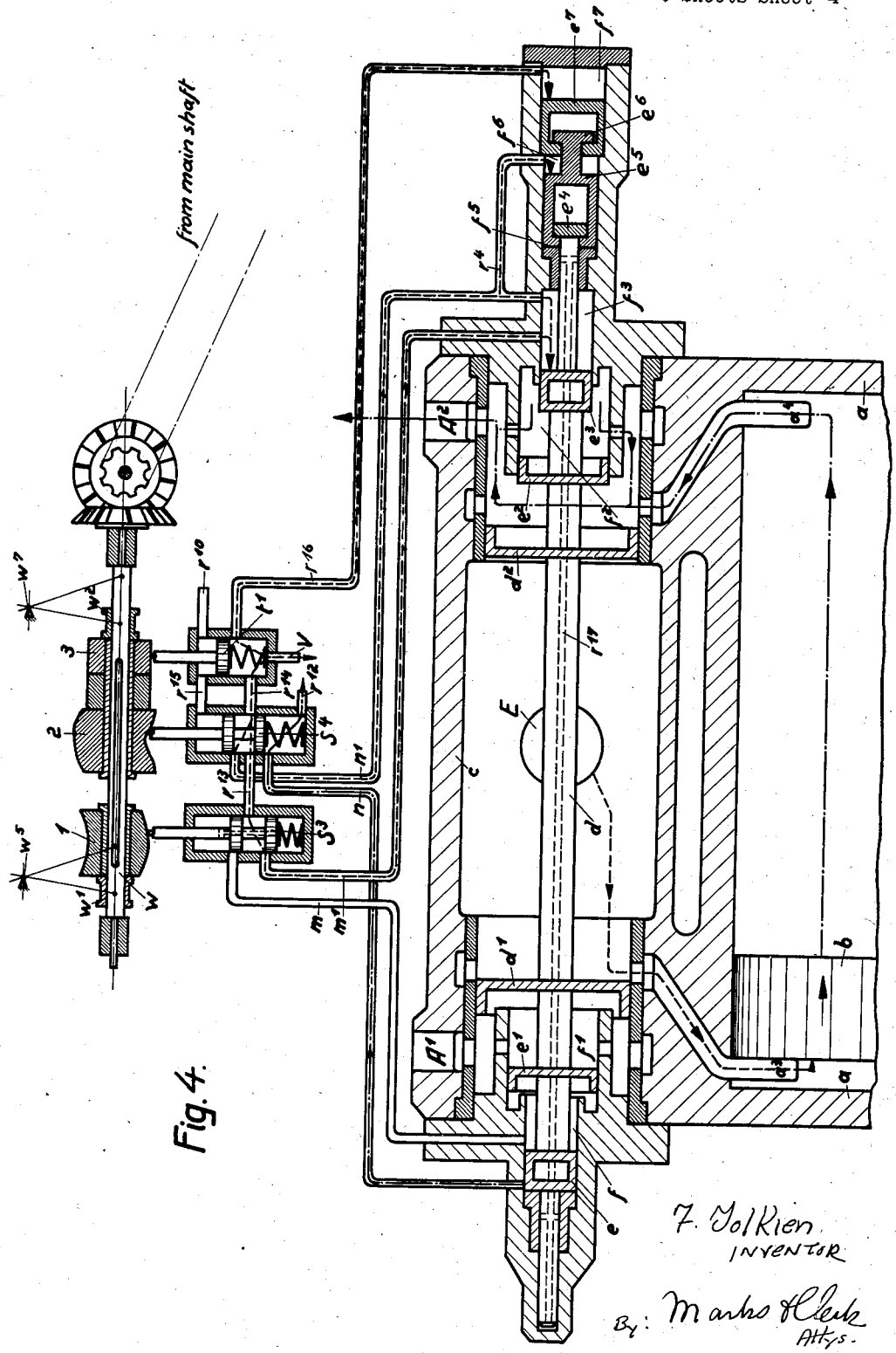
Figure 5:
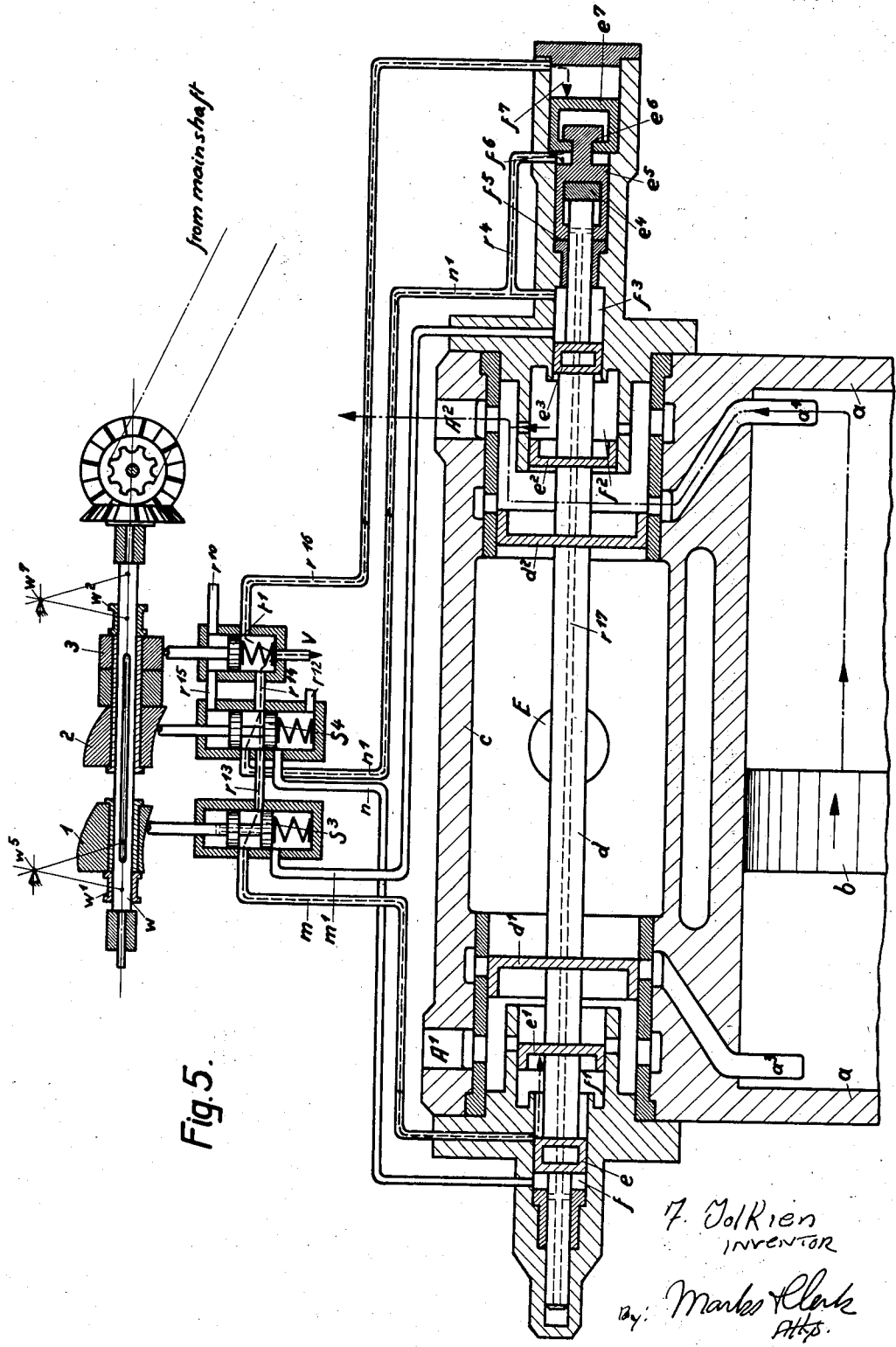
Figure 6:
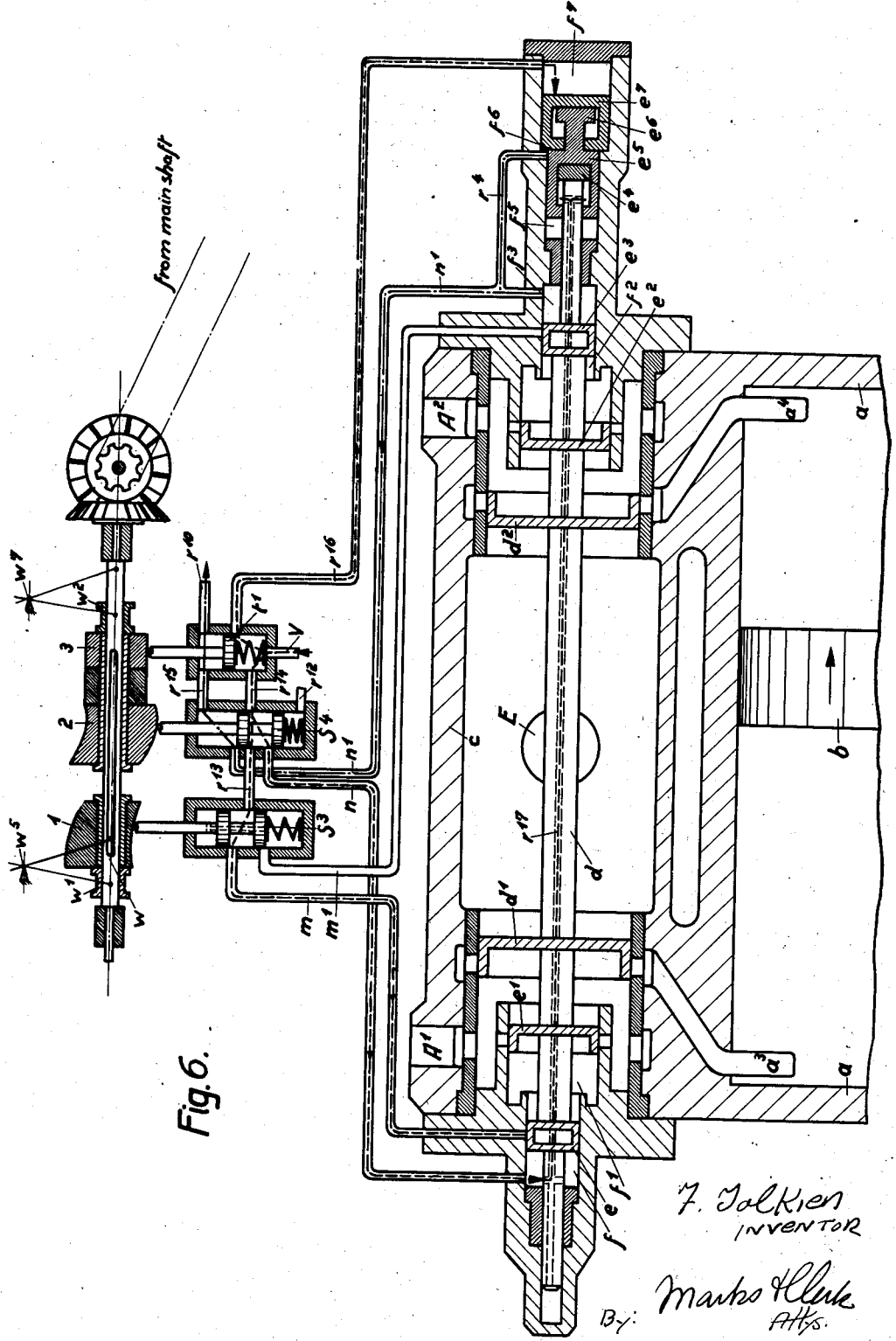

Figure 1 shows the beginning of the admission of steam to the right hand end of the cylinder, the working piston being situated at this end of the cylinder. Figure 2 shows the beginning of the expansion (cut off position). Figure 3 shows the beginning of compression on the left hand side of the working piston. Figure 4 shows the beginning of admission on the left hand end of the cylinder, the working piston being situated at that end of the cylinder. Figure 5 shows the beginning of expansion of the steam admitted to the left hand side of the piston (cut off position). Figure 6 shows the beginning of compression of the steam on the right hand side of the working piston. In these figures the main slide valve has substantially the same form as in my earlier application Ser. No. 366,394. On the rod $d$ are mounted the two slide valve bodies $d^1$ and $d^2$ and the differential pistons $e$, $e^1$, $e^2$, $e^3$ which operate in the reversing spaces $f$, $f^1$, $f^2$, $f^3$ of the valve casing $c$. In connection with the foregoing it is to be noted that the valve casing must be so designed at the various places that the differential pistons $e$ $e^1$ $e^2$ $e^3$ can bear against the valve walls in order to shut off spaces therein. Consequently, the valve casing $c$ and the said pistons form the reversing spaces while the pistons operate therein. The power cylinder $a$ is provided with the ports $a^3$ and $a^4$ which serve both for steam admission and for exhaust. The steam supply to the power cylinder $a$ takes place at E between the slide valve bodies $d^1$, $d^2$, while the steam exhaust through the aperture $A^1$, $A^2$ at the two ends of the valve casing.

For regulating the admission and the compression pilot valves are provided which differ from the constructional form in the application Ser. No. 366,394, the pilot valve $S^3$ serving for regulating the admission being connected by the pipes $m$, $m^1$ with the reversing spaces $f^1$, $f^2$ of the main pilot valve and admitting steam into these spaces alternately.

To the pilot valve $S^4$ are connected the pipes $n$, $n^1$ leading to the reversing spaces $f$, $f^3$ and also the outlet $r^{12}$ so that by moving this pilot valve the compression is regulated. The valve $S^3$ controls the steam inlets $m$ $m^1$ which admits the steam in the reversing spaces $F^1$ $F^2$ on both sides of the valve and thereby at each end of the piston stroke either the differential piston $e^1$ or $e^2$. The valve $S^3$ operates in the same manner as the corresponding valve S of the application 366,394. The regulation of the compression by means of the valve $S^4$ follows from the description of the operation of the device as hereinbefore stated. The pilot valves $S^3$ and $S^4$ are connected with one another by a pipe $r^{13}$. The steam distributing valve $t^1$ is connected to the live steam supply pipe V and is provided with the exhaust $r^{10}$ and communicates with the pilot valve $S^4$ through the pipes $r^{14}$ and $r^{15}$.

The control pilot valves $S^3$ and $S^4$ and the steam distributing slide valve $t^1$ are in this case actuated by oblique cams 1, 2, 3. The direction of admission and rotation may be changed by displacing these three oblique cams on their shaft $w$. For this purpose, the oblique cam 1 is provided with a sleeve $w^1$ and the two oblique cams 2, 3 with a sleeve $w^2$. These two sleeves have annular grooves wherein engage the levers $w^5$ $w^7$ (indicated only by dots and dashes) which are adapted to rotate on a fixed pivot so that when these levers $w^5$ $w^7$ rock, the cams 1, 2, 3 are displaced on the shaft for effecting the desired change in the direction of admission and rotation. The cams 1, 2, 3 are connected to the shaft $w$ by slot and key as indicated in the figures so that they are adapted to be displaced on the shaft but are rotated by the same. The valves $S^3$ $S^4$ and also the steam distributing valve $t^1$ bear with rollers, balls or the like against the cams and are pressed against the cams in the known manner by springs.

Now in order to subdivide the second stage of the main slide valve motion in accordance with the present invention for the purpose of obtaining a finer regulation of the compression, the dashpot piston $e^5$ of the main application is equipped with an abutment piston $e^6$ which in its turn works in a second floating dashpot piston $e^7$. The latter is of larger diameter than the dashpot piston $e^5$ moving in the space $f^5$ and moves in a space $f^6$ in the slide valve casing $c$ directly adjoining the space $f^5$. Into the right hand end of the space $f^6$ there opens a pipe $r^{16}$ which is connected to the steam distributing slide valve $t^1$ and is placed in connection with the latter alternately with the live steam pipe V and the steam exhaust $r^{10}$. The controlling steam entering the slide valve space $f^5$ through the pipe $r^4$ at the same time supplies steam to the left-hand side of the dashpot piston $e^7$. The admission of steam to the left hand side of the dashpot piston $e^5$ in the space $f^5$ is effected by means of a longitudinal bore $r^{17}$ in the slide valve rod $d$, which has apertures at both ends of the slide valve rod, so that, according to Fig. 1 for example, the controlling steam introduced into the reversing space $f$ can flow through the said bore $r^{17}$ into the space $f^5$. The live steam is indicated in Figs. 1 to 3 by a broken line and the exhaust by a dot and dash line.

This method of control operates in the following manner: In Fig. 1 the main slide valve is in the right hand end position in which the live steam can flow through the steam passage $a^4$ behind the power piston $b$. The dashpot pistons $e^5$ and $e^7$ are also in the right hand end position; the left hand surface of the dashpot piston $e^5$ being supplied with live steam through the passage $r^{17}$ which is led to the reversing space $f$ through the pipe $n$ from the pilot valve $S^4$. The controlling pipes $r^4$, $n^1$ and $r^{16}$ communicate through the pilot valves $S^4$ and $t^1$ with the exhaust $r^{10}$ so that the dashpot piston $e^7$ is relieved of the direct steam pressure. Live steam passes through the steam inlet aperture E and through the steam inlet passage $a^4$ into the cylinder and moves the power piston $b$ to the left. In this position of the valve, the pipe $m$ is not covered by the controlling piston $e$ so that the controlling steam can flow from the space $f$ into the pipe $m$. Since, however, the pipe $m$ is covered by the pilot valve $S^3$, the controlling steam is unable to escape. The advantage of this arrangement is that the controlling piston $e$ on the left and the controlling piston $e^3$ on the right hand side can be made shorter, whereby the weight of the valve is reduced.

Figure 2 shows the position of the parts in which the steam admission has ceased and expansion commences. By means of the rotating cam shaft $w$ which is rotated positively by means of gearing driven by the main driving shaft of the engine, the pilot valve $S^3$ is actuated by the cam 1 and moved into the position shown in which it allows steam admitted to the pilot valve from the steam inlet opening $v$ through the pipes $r^{14}$ and $r^{13}$ to pass into the pipe $m^1$, whereby the piston $e^2$ on the right hand side is supplied with steam. The main valve now moves to the left until the abutment piston $e^4$ bears against the left hand side of the dashpot piston $e^5$, the pistons $e^5$ and $e^7$ remaining in the respective positions they have hitherto occupied. By this movement of the main valve to the left, the steam passage $a^4$ is closed by the piston $d^2$ while the passage $a^3$ remains still open. The admission of steam to the cylinder is at an end and expansion commences of the steam in the cylinder to the right of the piston $b$. The steam which is in the cylinder on the left hand side of the piston still flows out to the exhaust.

Figure 3 shows the commencement of the compression. During the further rotation of the cam shaft $w$, the cam 2 thereon moves the pilot piston $S^4$ until it occupies the position shown in Fig. 3 in which it allows steam to pass through the pipes $n^1$ and $r^4$ into the reversing spaces $f^3$ and $f^6$. The steam in the reversing space $f^3$ acts on the right hand side of the piston $e^3$ so that the main slide valve again moves for a certain distance to the left. The reversing spaces $f^5$ and $f$ are evacuated through the pipes $r^{17}$ and $n$ through the valve $S^4$ and the outlet $r^{12}$. This movement to the left ceases when the abutment piston $e^6$ bears against the dashpot piston $e^7$ which is held fast in its extreme right hand position by controlling steam admitted to the reversing space $f^6$ through the pipe $r^4$. By this left hand movement of the main valve, the piston $d^1$ closes the passage $a^3$ and the steam exhaust period is at an end, compression commencing. Further movement of the main valve past this intermediate position, in which both steam passages $a^3$ and $a^4$ are closed, is prevented owing to the surface of the dashpot piston $e^7$ which is acted upon by controlling steam being larger than the sum of the surfaces of the pistons $e^3$ and $e^5$.

Figure 4 shows the position in which the pilot valve $t^1$ actuated by the cam 3 has uncovered the pipe $r^{16}$ so that the right hand side of the dashpot piston $e^7$ has steam supplied to it and consequently has moved to the left, the main slide valve being now in its extreme left hand position. The passages $a^3$ and $a^4$ are both open.

Live steam passes out of the inlet aperture E through the steam inlet passage $a^3$ behind the piston $b$, while the used steam escapes on the other side of the piston through the port $a^4$ to the exhaust $a^2$. The main slide valve is positively held in this position by the control steam acting in the reversing space $f^3$, and coming through the pipes $m^1$ and $n^1$ from the pilot valves $S^3$ and $S^4$.

Figure 5 shows the commencement of the expansion on the left hand side of the power piston $b$. The pilot valve $S^3$ has opened the pipe $m$ and permits the passage through it of the controlling steam into the reversing space $f^1$. By this means the main slide valve is moved until the abutment piston $e^4$ bears against the dashpot piston $e^5$. Further movement to the right is prevented, since the dashpot pistons $e^5$ and $e^7$ are held stationary by steam admitted thereto through the pipes $r^4$ and $r^{16}$. The piston $d^1$ has now closed the steam passage $a^3$ and expansion commences. The passage $a^4$ is still open and steam still continues to flow out through it.

Figure 6 shows the position of the parts when compression on the right hand side of the piston is taking place. The pilot valve $S^4$ controls the passage of live steam through the pipe $n$ behind the piston $e$ in the reversing space $f$ from which steam passes through the pipe $r^{17}$ in the valve rod behind the dashpot piston $e^5$ while the controlling steam escapes from the reversing space $f^3$ through the pipe $n^1$ and pilot valve $S^4$ to the exhaust $r^{10}$. The reversing space $f^6$ is evacuated through $r^4$. The main valve moves to the right until the abutment piston $e^6$ bears against the right hand side of the dashpot piston $e^7$, which remains stationary in its extreme left hand position being by steam admitted to the reversing space $f^7$ through the pipe $r^{16}$. By means of this movement of the main valve, the passage $a^4$ is closed and compression commences.

In order that the main slide valve will now move into the end position shown in Figure 1, the pipe $r^{16}$ is evacuated through the pilot valve $t^1$. The steam flowing in through the pipe $n$ into the reversing space $f$ acts on the piston $e$ and forces the main valve into its extreme right hand position. Both passages $a^3$ and $a^4$ are opened.

Since the laps of the slide valve bodies $d^1$ and $d^2$ after the admission of steam at E in the second intermediate position are only small, there is a practically constant admission of steam over a greater range of speeds for the same moment of opening and closing of the slide valve $t^1$.

What I claim is:

1. In a reciprocating steam engine having a steam cylinder a piston movable therein, a slide valve casing having inlet and exhaust ports in open communication with said cylinder, a main slide valve movable in said slide valve casing for controlling the admission to and exhaust of steam from said steam cylinder and controlling gear for said valve, comprising the combination of two pairs of differential pistons, conduits for supplying steam to one of the differential pistons of each pair for moving the valve into an initial, steam cut-off position, conduits for supplying steam to the other differential piston of each pair for moving the slide valve further into an end position for admitting steam to the opposite end of the cylinder, with means for arresting the valve in said initial cut-off position for closing the admission port, comprising a floating hollow dashpot piston, an abutment piston on the valve and movable in said dashpot piston in the line of movement of the valve and capable of striking against the ends of the space within said dashpot piston, means for arresting the valve in an intermediate position for closing the exhaust port for regulating the compression, comprising a floating hollow buffer piston, an abutment piston on the dashpot piston and movable in said buffer piston in the line of movement of the valve and capable of striking against the ends of the space within said buffer piston, a conduit for admitting steam to the side of the dashpot piston adjacent the valve, said dashpot piston being adapted to obstruct communication between said conduit and said side of the dashpot piston when the main valve is located in the end position into which it is moved by steam supplied to the second-mentioned differential piston of the pair remote from the dashpot piston, a conduit for admitting steam to the adjacent sides of the buffer and dashpot pistons, a conduit for admitting steam to the other side of the buffer piston remote from the dashpot piston, and pilot valves interposed in said conduits for controlling the supply of steam to the said differential pistons, and the supply of steam successively to said dashpot piston and buffer piston for arresting the valve in said initial and intermediate positions and subsequently allowing the valve to move into said end position for admitting steam to the opposite end of the cylinder, said pilot valves being operatively connected to the engine piston so as to be positively actuatable thereby.

2. In a reciprocating steam engine having a steam cylinder, a piston movable therein, a slide valve casing having inlet and exhaust ports in open communication with said cylinder, a main slide valve movable in said slide valve casing for controlling the admission to and exhaust of steam from said steam cylinder and controlling gear for said valve, comprising the combination of two pairs of differential pistons, reversing spaces in said valve casing adjacent one of the differential pistons of each pair, conduits for supplying steam to said reversing spaces and a pilot valve for controlling the steam supply to said conduits alternately for moving the valve into an end position for admitting steam to one end of the cylinder, reversing spaces adjacent the other differential pistons of each pair, conduits for supplying steam to said other reversing spaces and a second pilot valve for controlling the steam supply to said conduits alternately for moving the valve into an initial cut-off position, with a floating hollow dashpot piston, an abutment piston on the main valve and movable in said dashpot piston in the line of movement of the valve and capable of striking against the ends of the space within said dashpot piston for arresting the main valve in said initial steam cut-off position, a floating hollow buffer piston, an abutment piston on the dashpot piston and movable in said buffer piston in the line of movement of the main valve and capable of striking against the ends of the space within said buffer piston for arresting the main valve in an intermediate position for closing the exhaust port for regulating the compression, a conduit in the main valve for admitting steam to the side of the dashpot piston adjacent the main valve, said dashpot piston being adapted to obstruct communication between said conduit and said side of the dashpot piston when the main valve is located in the end position into which it is moved by steam supplied to the first-mentioned differential piston of the pair remote from the dashpot piston, a conduit connected to the first pilot valve for supplying steam to the adjacent sides of the dashpot and buffer pistons, a third pilot valve, and a conduit connected thereto for supplying steam to the side of the buffer piston remote from the dashpot piston, and actuating means for said pilot valves operatively connected to the engine piston and arranged to operate the first pilot valve to admit steam to the reversing space adjacent the one differential piston of one pair and the second pilot valve to admit steam to the reversing space adjacent the other differential piston of the other pair.

3. In a reciprocating steam engine, the combination as set forth in claim 2, in which the actuating means for the pilot valves comprise a driving shaft and oblique cams mounted on said driving shaft so as to be capable of sliding axially thereon and arranged to coact with the pilot valves in different axial positions on said shaft.

FRITZ TOLKIEN.